United States Patent [19]

Piget

[11] 4,319,103
[45] Mar. 9, 1982

[54] PROTECTIVE ENCASEMENT FOR MACHINE TOOLS

[76] Inventor: Maurice Piget, Boisset les Prevanches, 27120 Pacy sur Eure, France

[21] Appl. No.: 119,721

[22] Filed: Feb. 8, 1980

[51] Int. Cl.³ .............................................. H01H 3/16
[52] U.S. Cl. ................................. 200/61.62; 307/326; 335/206; 335/207; 361/429
[58] Field of Search ............... 200/61.62, 61.93, 61.71, 200/61.75, 293, 303, 334, 302; 335/205, 206, 207; 220/84, 23; 361/331, 380, 386, 424, 429; 52/731, 732, 221; 307/326, 328; 328/7

[56] References Cited

U.S. PATENT DOCUMENTS 3,627,959  12/1971  Chapell ................................ 335/205

FOREIGN PATENT DOCUMENTS 2659483  7/1978  Fed. Rep. of Germany ...... 361/429

Primary Examiner—J. V. Truhe
Assistant Examiner—Morris Ginsburg
Attorney, Agent, or Firm—Sughrue, Mion, Zinn, Macpeak and Seas

[57] ABSTRACT

A protective encasement for machine tools comprises a fixed part and a movable part composed of profiles assembled to form uprights and cross-pieces, bearing components controlling safety circuits activated by action of the movable part. The fixed part is composed of a single profile with a closed central cell, surrounded by several open cells which can receive windows and fixing and activating means and can be closed, and which contain the safety components and circuits. The movable part comprises a L-shaped profile connected to the fixed part and protecting contacts which cooperate with the components of the fixed part.

7 Claims, 8 Drawing Figures

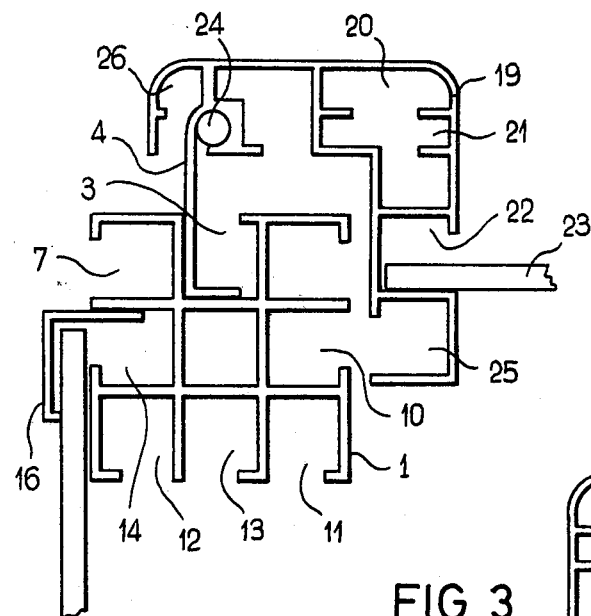
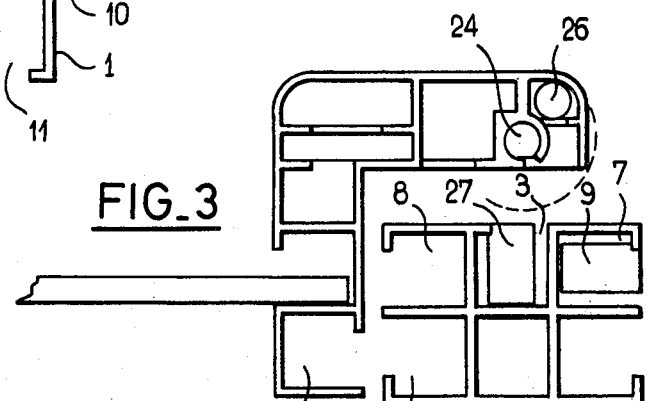
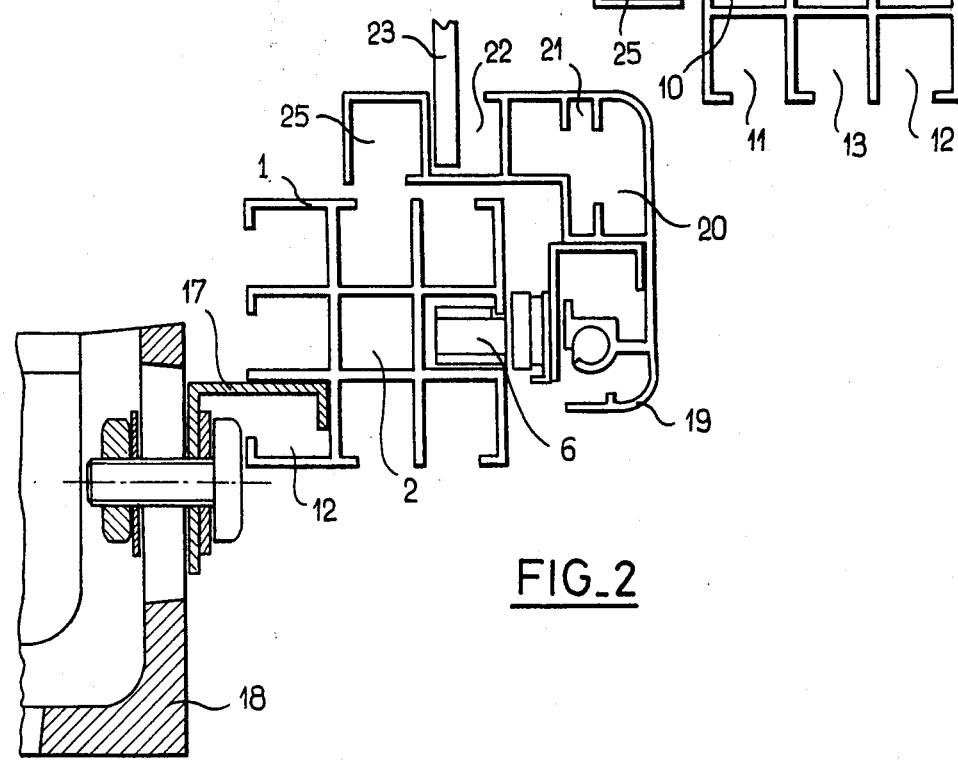
FIG_1
FIG_3
FIG_2

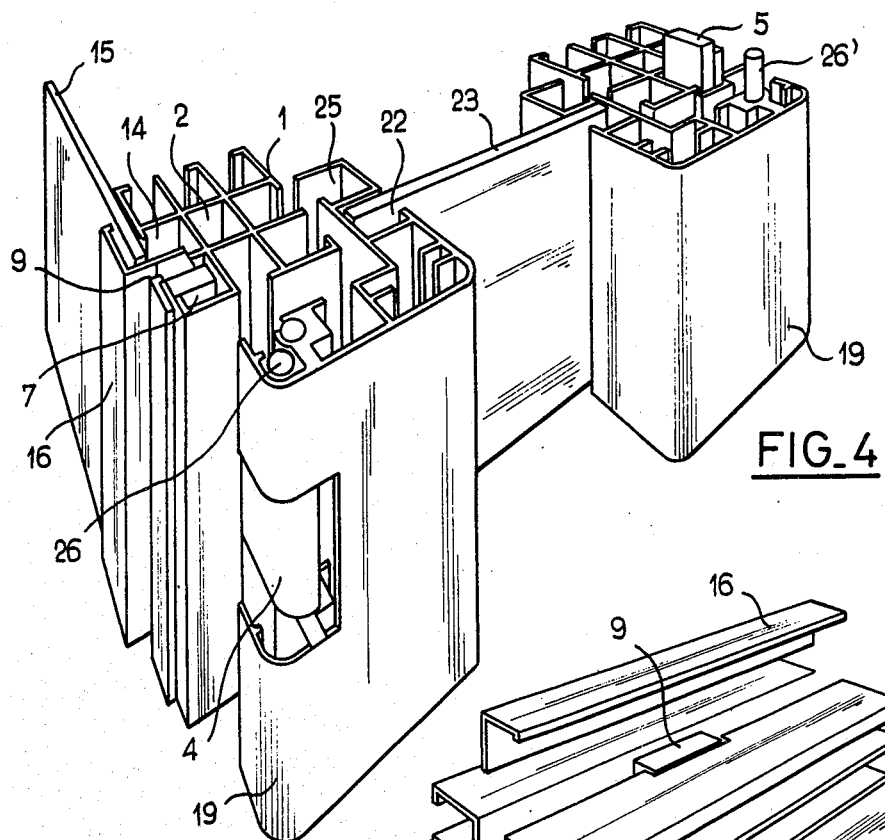
FIG_4
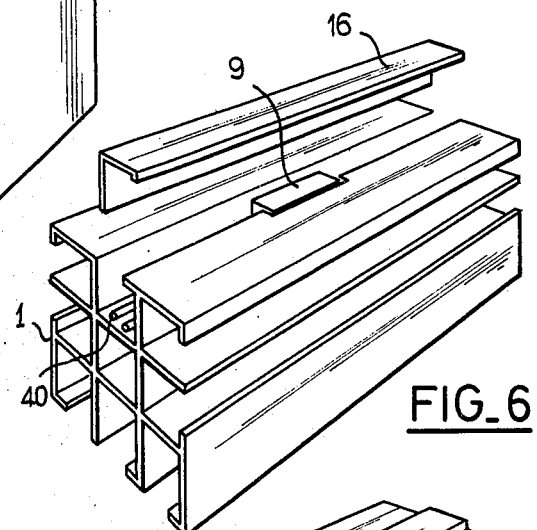
FIG_6
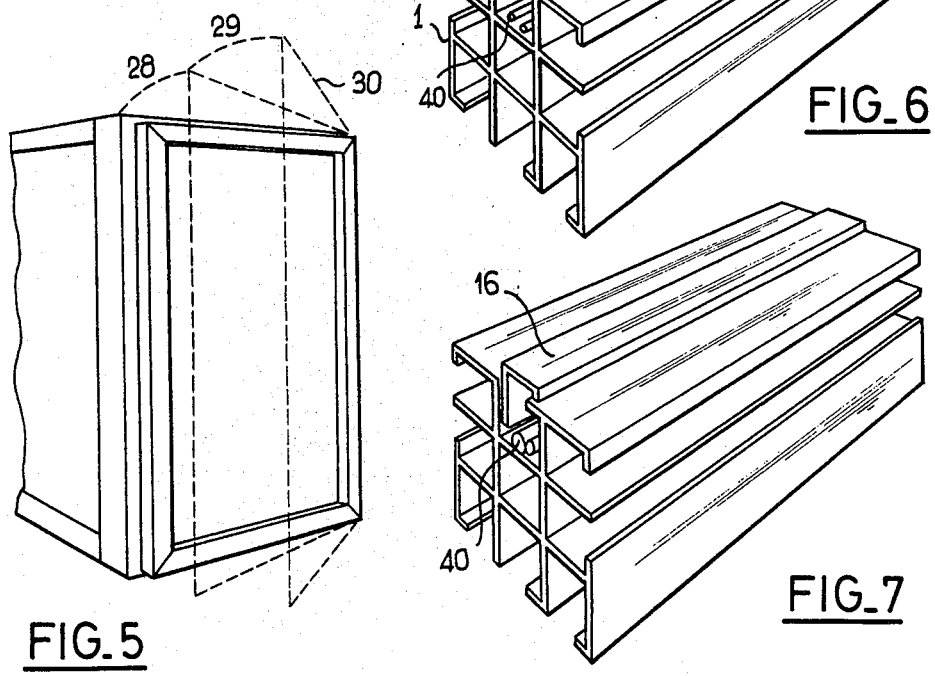
FIG_5
FIG_7

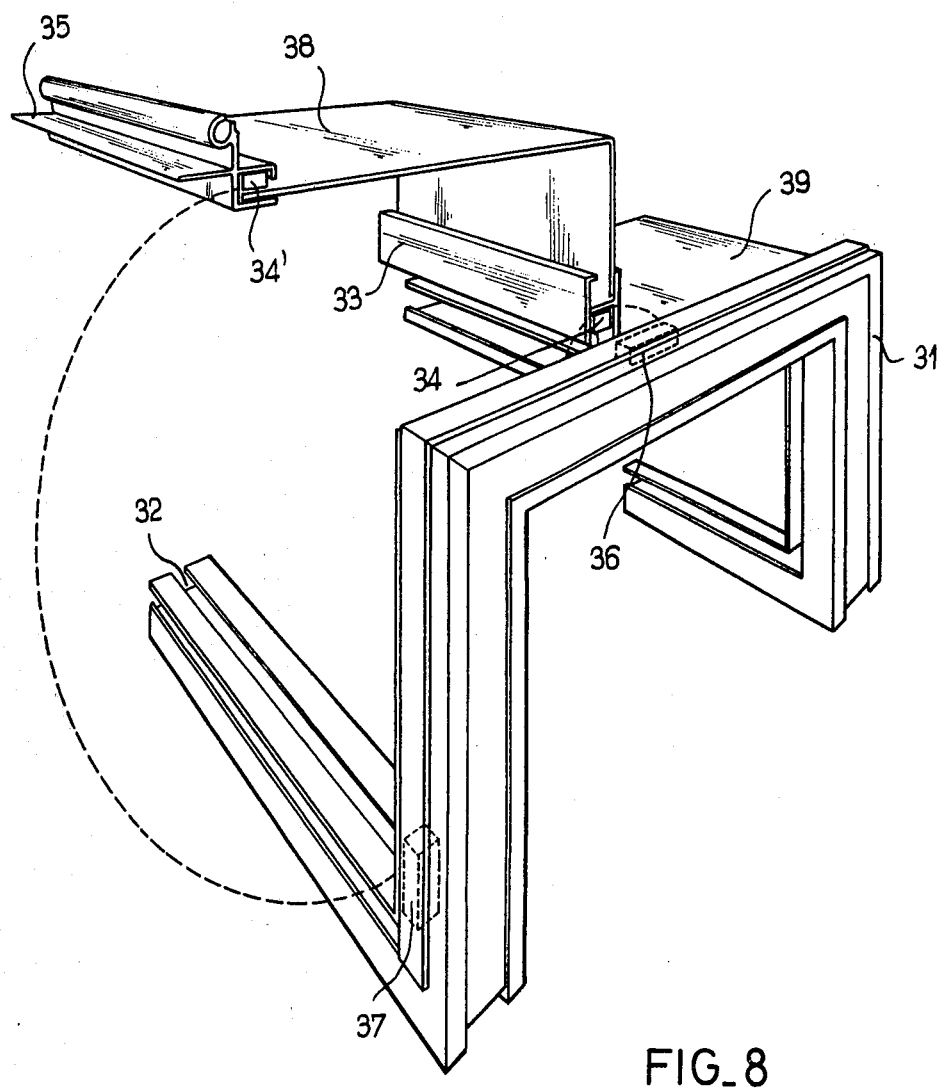
FIG_8

PROTECTIVE ENCASEMENT FOR MACHINE TOOLS

BACKGROUND OF THE INVENTION

This invention relates to a protective encasement for machine tools, that are dangerous and can cause injury such as packaging and labelling machines. The protective encasement is made up of two parts, one fixed and the other movable, each part being composed of a profile having a structure which can incorporate and protect control components and safety circuits from the environment. The contacts, components and safety devices which provide active and passive protection from the machine tools.

Accidents, such as injuries to hand, arms, eyes etc., to people employed on machine tools have led professional organizations and governments to impose on manufacturers regulations concerning complex individual and collective protection apparatus. Due to the variety of operations that may be performed by a single type of machine, each type of protection becomes an individual embodiment which creates a handicap from the point of view of cost.

SUMMARY OF THE INVENTION

The principal object of the present invention is to provide around each machine a protective glass enclosure which enables control of the operation of the machine to be carried out from outside of the enclosure, the glass parts being framed by a protective encasement comprising two parts, one fixed, the other movable, composed of profiles assembled by known means, such as screws or clips, and the parts are put into position without the use of parts other than the windows, which are first cut to size.

A further object of the present invention is to provide a protective encasement composed of a fixed part and of a movable part, which upon separation interrupts electric control safety circuits in the fixed and movable parts, either by connecting or disconnecting the control components such as contacts and magnetized bodies.

The protective encasement according to the present invention comprises a fixed part and a movable part composed of profiles assembled by any known means such as screws or clips forming uprights and crosspieces, supporting the control components of the safety circuits activated by operating the movable part and, according to one of the principal characteristics of the invention, the fixed part is composed of a single profile with a closed central cell surrounded by several open cells or grooves which have and protect the components and the safety circuits. The open cells are capable of being closed. The movable part is composed of a profile which hinges on the fixed part and this profile also protects the components in the movable part which cooperates with those in the fixed part.

The fixed profile preferably comprises a central closed cell surrounded by nine open cells or grooves, which can be occupied by windows, fixing and operating components, as well as the electric components and cables which constitute the safety circuits system. The cells are capable of being closed, after the components and circuits have been put in place by an additional fitted profile. The fixed profile is of a general square cross-section.

The movable profile is preferably L-shaped and comprises a closed angle cell and open cells which receive and support the windows, and contain latching components, pivoting axes for hinges, and magnetized bodies to provide active protection. This movable profile forms a door which fits onto the fixed profile.

This protective encasement which supports the windows and contains the circuit control means, enables the components of the safety circuits to be removed from view, thus limiting the risks of improper movement or damage to the circuits.

Moreover, the protective encasement of the invention is entirely composed of two types of profiles only, to which are added the windows, the latching components, the electric components and cables, which simplifies its manufacture and lowers its cost.

BRIEF DESCRIPTION OF THE DRAWINGS

FIGS. 1 to 7 relate to an encasement according to the invention adapted to large structures, whereas FIG. 8 relates an encasement for a small volume structure.

FIG. 1 shows a horizontal cross section of the vertical fixed and movable profiles at the hinge side of the door.

FIG. 2 is a vertical cross section of the lower horizontal fixed and movable at the non-hinged side of the door profiles.

FIG. 3 is a horizontal cross section of the vertical profiles at the hinge side of the door showing an example of the placement of the safety components, in accordance with the invention.

FIG. 4 is a perspective and cross-sectional view of the protective encasement door showing two corresponding uprights, each composed of a fixed profile and of a movable profile.

FIG. 5 shows a perspective view of the assembled fixed and movable profiles.

FIGS. 6 and 7 show a detail of the mounting of the fixed profile.

FIG. 8 is a perspective view of an encasement according to the invention adapted for a small volume machine tool.

DETAILED DESCRIPTION OF THE PREFERRED EMBODIMENT

In the protective encasement, for large machine tools, shown in FIGS. 1 to 7, the fixed part, rigidly connected to the frame of the machine, comprises a profile 1 made of a light alloy, having a square cross section and with multiple cells, wherein a central cell 2 is intended to receive mechanical right-angled holding braces (not shown) giving a profile mechanical strength, and central cell 2 and which is surrounded by functional cells 3, 7, 8, 10, 11, 12, 13 and 14. Components and circuits can be placed in these various cells by means of known spring blades (now shown).

In the vertical profiles, the cell 3 in the fixed profile 1 receives, on one side of the door, the hinges 4 forming the pivoting axis of the movable part, and on the opposite side the contact component 5 shown in FIG. 4.

FIG. 5 shows a perspective view of a door having a hinged vertical profile, and the dotted vertical lines show several positions of the vertical profile on the opposite side of the door. The upper and lower horizontal profiles interconnect the hinged and non-hinged vertical profiles as shown in FIG. 5. In FIG. 2, the cell 3 of the horizontal profiles is intended to receive small magnetic closing latches 6 in order to maintain the door in a closed position. The cell 7 is intended to receive the components for a so-called safety contact 9. The cells 8, 10, 11, 12 and 13 serve as sleeves for receiving assembly components, or for the control or safety components and circuits. The cell 14 serves to receive an angle piece 16 which provides support for the window 15. In the horizonal base profile for the protective enclosure, the cell 12 serves to receive the connecting parts 17 with the right-angled brace 18 which can be attached to the machine block, as shown in FIG. 2.

The movable profile 19, also made from light alloy, has the shape of an angle and is juxtaposed, as shown in FIGS. 1 to 4 to two of the surfaces of the fixed profile 1, to form a door. It comprises a closed cell 20 forming the angle, in which is kept a sleeve 21 for receiving the right-angled braces for mechanical holding, a cell 22 for receiving the window 23, a cell 24 for receiving the pivoting axis of the hinges in a vertical upright, or of a part providing the closing by contact with the closing latch 6 in a horizontal cross-piece, a cell 25 opposite the cell 10 of the fixed profile when the door is closed, and a cell for receiving a magnetized body 26 of so-called active protection on the side of the door having the axis of rotation of the movable part, and of a magnetized body 26', for so-called passive protection, on the other side of the door.

As the door is opened, as shown in FIG. 3, the magnetized body 26 near the pivoting axis 24 approaches the contact 9 placed in cell 7, and in the opposite case, as is shown in FIG. 4, the magnetized body 26' moves away from the contact in such a manner that on the side of the pivoting axis, the motor circuit is interrupted by magnetized body 26 approaching contact 9. This device is termed "active protection", wherein on the side opposite of the door, the interruption of the motor circuit is caused by the disconnection of magnetized body 26' and contact 5 creating, a "passive protection" device. It is the succession of these two operations which provides absolute, secure safety, through interruption of the motor currents in the machine tools. The passive protection acts first as soon as there is separation of the magnetized mass 26' from the contact 5, but as soon as the door is opened far enough to enable an operator to neutralize the action of the contact 5 with magnetized body 26', the active protection is activated, since the magnetized body 26 is sufficiently close to the contact 9 because of the angle of opening of the door. Because the components are integrated into the encasement and are incapable of being either moved or withdrawn, the protection is secure. In certain cases requiring only limited protection, only the active safety device alone need be provided.

In accordance with one advantageous characteristic of the invention, small magnetic latches 6 are used which exert a relatively high attraction force on the movable part. Thus in order to open the door, the operator must exert sufficient force to overcome the return force of the small magnetic latch, which has the effect of providing the opening movement of the door with a relatively high initial speed, and, consequently, rapidly bringing the magnetized body 26 to contact 9, causing the active protection to function immediately.

The combination of these two types of protection enables the creation, using a door with progressive opening positions, of disruptions or restorations of the motor current, enabling adjustment operations or clearing of blocked parts since, as shown schematically in FIG. 5, there is:

- an area 28 for initial current interruption, with accompanying luminous signal, if desired;
- a neutralization area 29 corresponding to a larger angle of opening of the door, where active and passive protection are not in effect, and which, with an appropriate device, enables momentary restoration of the motor current, with accompanying audio or luminous signal; after restoration of the motor current the normal operation of the cycle is restored by shutting the door;
- an area 30 corresponding to a larger angle of opening of the door, causing definitive interruption of the current; the restoration of the motor circuit can only then take place after the door is closed and the controls at the main box are activated.

Such a device allows the operator to intervene in all the operations of an accidental nature by simply operating the door, and still maintain the required protection. When the machine works properly, the operator merely watches the machine through the window 23 and does not touch the door.

The safety mechanism allows for the planning of complex devices. Thus one magnetized body can act on several contact lines fitted in neighboring cells. Thus, by operating the door, successive interruptions of different circuits can be obtained.

By placing, for example, two contact lines in cells 3 and 7, as shown in FIG. 3, in a first opening position, the approach of the magnetized mass 26 to the contact 9 causes an interruption in motor current in the work station provided immediately behind the door; in the next opening position, while maintaining the interruption in the first circuit, the approach of the magnetized body 26 to the contact 27 causes a second interruption affecting the motor current of an adjacent work station. Such a device, which enables an operator to isolate his own work station, also enables him to isolate an adjacent work station when necessary. Thus, in the operation of a line of machines, in the case of an operator who cannot provide his own safety, another operator can, at a distance, intervene without having to move. All these devices can be combined to create at the level of one of the doors a programming for occasional interventions, whereas in the conventional systems these devices are generally assembled at the principal control table, often distant from the group of work stations.

As is shown in FIG. 6, an angle piece 16, identical to that holding the window 15, can be inserted into a cell to provide protection of a component, for example the contact 9, whose position can be marked by a notch, and the cables 40 of the circuits. This angle piece 16 can be held in place by known means and thus provides good protection for the components, as is shown in FIG. 7, further reinforcing the safety.

In FIG. 8, which represents a protective encasement according to the invention, as applied to a small volume structure, the fixed part is composed of the light alloy profile 31 comprising multiple cells similar to the profile 1. The fixed window 39 is placed in the cell 32 of the fixed profile.

The movable part comprises, on the side of the pivoting axis, a profile 33 with double cells, one for receiving the movable window 38 and the other for receiving a magnetized body. At its other edge, the window 38 is mounted with a profile 35 one end of whose cell encloses the magnetized body 34' for passive protection. The contact components are placed in the same cells of the fixed profile 31, at 36 for the active protection and at 37 for the passive protection.

What is claimed is:

1. A protective encasement for machine tools, comprising a fixed part and a movable part composed of a plurality of assembled profiles forming uprights and cross-pieces, and safety circuits comprising contacts and components activated by the operation of the movable part, wherein the fixed part comprises a single profile with a central closed cell surrounded by several open cells or grooves which can be closed and which contain some of the contacts and components, and the movable part comprises a profile which articulates on the fixed part and contains the remaining contacts and components which cooperate with those of the fixed part upon movement of the movable part to activate the safety circuits.

2. The protective encasement of claim 1 wherein said plurality of profiles comprise two profiles of geometrically different configurations, the fixed part composed of one of said profiles, the movable part composed of another of said profiles.

3. The protective encasement of claim 1, wherin the profile of the fixed part has a generaly square cross-section and comprises, around said central closed cell, open cells capable of receiving windows, latching and operating means, as well as the safety circuits, the open cells capable of being closed by an additional profile.

4. The protective encasement of claim 1, wherein the movable part is angularly shaped in justaposition to two surfaces of the fixed profile and comprises a closed angle cell and open cells for receiving windows, latching means for pivotably connecting the movable part with the fixed part about an axis, and magnetized bodies for active protection.

5. The protective encasement of claims 1, 2, 3 or 4 wherein the safety circuits are fitted in the profiles in such a manner that the progressive movement of the movable profile in relation to the fixed profile causes successive interruptions in different circuits.

6. The protective encasement of claim 5, wherein a magnetized body is placed in one cell of the movable profile adjacent to a pivoting axis, in such a manner that the movement of the movable profile in relation to the fixed profile places the magnetized body successively in the proximity of two contacts placed in two adjacent cells of the fixed profile.

7. The protective encasement of claim 1, wherein the profiles are made of a light alloy.

* * * * *